July 19, 1960 R. JOHNSON 2,945,412
SLIP-FREE FISH NETTING AND METHOD OF MAKING SAME
Filed March 27, 1956 2 Sheets-Sheet 1

Inventor
Roland Johnson
By Alan Awabey
Attorney

July 19, 1960  R. JOHNSON  2,945,412
SLIP-FREE FISH NETTING AND METHOD OF MAKING SAME
Filed March 27, 1956  2 Sheets-Sheet 2

Inventor
Roland Johnson
By Allan Swabey
Attorney

United States Patent Office 2,945,412
Patented July 19, 1960

2,945,412

SLIP-FREE FISH NETTING AND METHOD OF MAKING SAME

Roland Johnson, Drummondville, Quebec, Canada, assignor to Dominion Textile Company Limited, Montreal, Quebec, Canada, a corporation of Canada Filed Mar. 27, 1956, Ser. No. 574,173

Claims priority, application Canada Mar. 1, 1956

5 Claims. (Cl. 87—1)

The present invention relates to the manufacture of fish netting.

More particularly, it relates to setting the netting to prevent "slip-mesh." This is a problem encountered specially in making fish netting from yarns of synthetic resin filaments, particularly linear polymers, for example nylon.

The problem of "slip-mesh" is one which has been plaguing the manufacturers of netting from certain synthetic resin filaments.

One method which has been satisfactory in overcoming this problem is by modifying the elastic memory of the twine material by subjecting the netting to wet heat followed by dry heat while keeping it under tension from the time it is knotted, as described in U.S. Patent 2,653,372, September 29, 1953.

Coating processes have also been suggested for various types of textile fabrics in which a thick solution of a resinous material has been applied to the twine and appears on its surface as a perceptible coating. With netting, this has the disadvantage of changing its hand and increasing its weight.

APPLICANT'S DEVELOPMENT

The applicant has now been able to overcome the problem of "slip-mesh" and the disadvantages of prior art methods of attempting to do so.

This is done, according to the present invention, by impregnating the netting at room temperature with a solution of rosin which is effective to form a skeleton structure within the twine, and thus keep it in the same shape it is at the time that the rosin sets. The resulting netting has a uniform rosin content of from about 1% to about 40% by weight of the twine. For economical and practical reasons, a content of 1% to 10% is preferred. With higher rosin concentrations, the netting tends to become more rigid. With the rosin treatment, the netting is stiffer when dry than untreated twine. However, when the slightly stiffer dry netting is placed in water the stiffness disappears. In other words, the hand of the treated netting is not significantly different from the untreated netting when fished, that is when wet. Furthermore, it is effective to subdue the elastic memory of the twine material to prevent knots from slipping. Preferred results are obtained by impregnating the netting after it is formed, either in its stretched or unstretched form, but before the knots have loosened. Or the netting can be stretched after weaving to tighten any loose knots and then dipped in the rosin solution before the knots have had a chance to open.

Rosin is a very brittle material when compared to various synthetic resins and thus would be believed to be unsuitable to subdue the elastic memory of twine. However, it has unexpectedly been found, in accordance with the present invention, that the rosin does restrain the twine and sets the knots of synthetic linear polymers in a manner for exceeding the setting accomplished using other resins as suggested by the prior art.

According to the invention, fish netting is made as follows. In the knotting step, in a method involving simultaneous knotting and setting steps continuously performed on successive portions of a length of the netting, while the entire length is kept under tension effective to retain the knots tight and while the netting is advanced at normal knotting speed the netting is knotted on a netting loom from a twine made up of continuous filaments of a synthetic fiber, preferably made from a linear condensation polymer, so that evenly spaced apart knots (preferably single weaver's knots) are intervened by precise lengths of twine. The netting is advanced through the loom during its formation under tension effective to maintain the knots tight. This tension is preferably not greater than ten percent of the breaking strength of the twine. Then the netting is advanced from the loom while still under tension through an impregnating bath containing a rosin-water base solution of a rosin-alcohol base solution containing an alcohol-soluble synthetic resin.

The impregnating solution contains from 1% to 40% preferably from 1% to 10% by weight of a rosin dissolved in water with the aid of dissolving agents. The length of time during which the netting is impregnated in the solution is very short, for example, about 20 seconds.

The term "rosin" as used herein is intended to cover any of the gum or wood rosins, preferably those having a saponification number of from 145 to 270. Natural rosins which have been chemically modified may also be used and fall within the scope of the term "rosin." As example of rosins, there may be mentioned abietic acid. As an example of modified rosins, there may be mentioned those rosins to which has been added glycerin or those treated with lime or modified by catalytic disproportionation. Examples of modified rosins are the "Poly-pale" resins and "Staybelite" resins which are manufactured and sold by Hercules Powder Co., Wilmington, Delaware.

Also in accordance with the present invention, there may be alternatively used a rosin solution containing from 0.5% to 3% by weight of an alcohol-soluble synthetic resin in an alcohol base. When the rosin solution contains an alcohol-soluble synthetic resin, the solvent is an alcohol, preferably isopropyl or ethyl alcohol, which can be diluted with a compatible amount of water usually less than about 15% by weight.

A preferred dissolving agent for the rosin is isopropyl alcohol. Methyl or ethyl alcohol can also be used, but in either case when a water base is used a further dissolving agent of the nature of triethanolamine must also be used. The triethanolamine with sodium hydroxide helps to keep the rosin in solution in the water base. Alternatively, the rosin solution can be prepared by dissolving the rosin in either alcohol or a suitable organic solvent.

The netting is moved from the impregnating bath whether under tension or not and the solvent removed. The temperature of the solution and drying is preferably warm, but preferably not high enough to alter the mesh size of the netting by heat modification of the twine material. This leaves the impregnant in the twine of the netting so that the form of the knots is permanently retained.

It is believed that the rosin acts as a non-slip agent, and forms within the twine and about the knots a skeleton structure which is elastic in nature and which tends to come back to its original form. The tendency of this structure to return to its original form is greater than that of the twine to loosen the knots.

This process can conveniently be carried out on an apparatus having the following features. It includes a bath for containing a treating solution. Means are provided for conveying the netting under tension from the netting machine through the bath, then through a solvent removal zone while still under tension and thence to storage. Treating of the netting under tension is preferred.

The invention will be understood more completely by reference to the accompanying drawings which illustrate a preferred form of netting made according to the present invention and a convenient form of apparatus in which the invention may be carried out, and in which.

Figure 1:
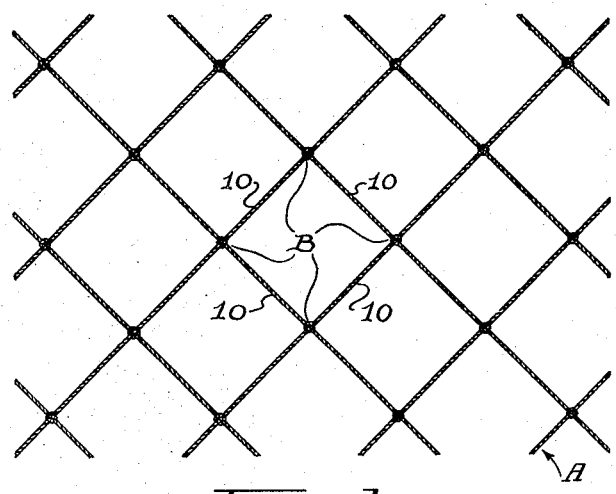
Figure 1 is a diagrammatic representation of a piece of fish netting according to the invention.
Figure 2:
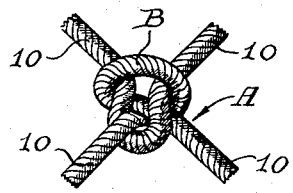
Figure 2 is an enlarged view of a portion of the netting shown in Figure 1, illustrating particularly regions including knots.

Referring more particularly to the drawings, the netting treated according to the invention is illustrated diagrammaticaly in Figures 1 and 2. The netting is generally designated as A. The knots are shown as B. The knots are intervened by substantially precise and even lengths of twine 10. The netting, including the knots, is impregnated and the material of the netting imperceptibly coated with a rosin or a rosin and alcohol-soluble nylon deposit from a solution. The deposit is so thin as to be substantially imperceptible.

Figure 3:
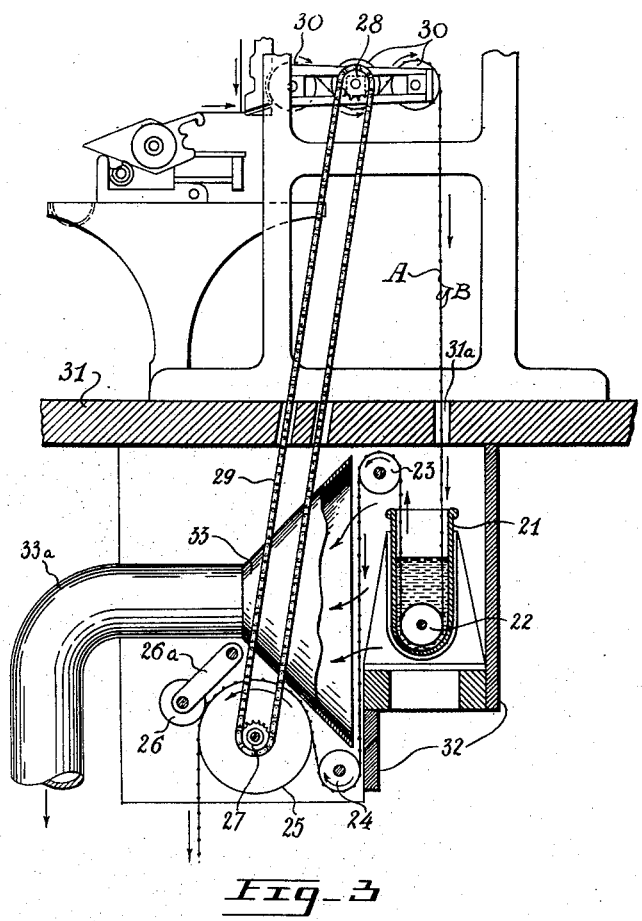
Figure 3 is a side elevation partly in vertical cross section through an apparatus in which netting is being treated according to the invention.

In the setting step, the impregnating agent is applied preferably by passing the netting through an apparatus such as that shown in Figure 3. In this apparatus 21 is a tank containing the treating solution. 22 is a roller in the tank about which the netting passes. 24 is a roller below the tank about which the netting passes on its way from the tank. 25 is a larger roller whose function is to hold the netting and pull it through the tank. 26 is a roller mounted on pivoted arms 26a. The roller 26 presses the netting against the roller 25. 27 is a sprocket or chain wheel mounted on a shaft extending axially from the roller 25. The wheel 27 is driven by a chain 29 from a sprocket 28 which is mounted on the mesh size rollers 30 forming an integral part of the net-making machine. 33 is a fume hood connected to a suction fan to draw off solvent fumes. The fume hood 33 is connected by a conduit 33a with a solvent recovery apparatus. Panelling 32 encloses the installation.

OPERATION

Normally the netting would be made in a knotting step on the net-making machine or loom and after passing over the mesh size rollers 30, would pass through the floor 31 into storage where it would remain until required.

But, when treating netting according to the invention, instead of going to storage, the netting A preferably passes through the floor opening 31a as usual, but then enters the tank 21 passing around the roller 22 beneath the level of the treating solution. Thence, it passes around the rollers 23 and 24, at which position the fume hood 33 removes the solvent, and, as an incident thereto, dries the netting.

The netting then passes around the draw roller 25 which is driven from the mesh size rollers 30 by means of the chain wheels 27 and 28 and the chain 29. The press or nip roller 26 keeps the netting in close contact with the draw roller 25. From there the finished netting goes to storage.

From the time it is woven in the knotting step, on the net-making machine or loom, which is not shown, to the time it is dried and finished, the netting is held under continual tension between the mesh size rollers 30 and the draw roller 25. This keeps the knots tight until the impregnating material has set to hold them in shape.

By this treatment the netting becomes impregnated with a rosin or a rosin and synthetic resin. The netting is kept under tension during the impregnation and afterwards until the rosin or rosin and synthetic resin has had time to set about and within the filaments sufficiently for it to hold the knots in shape and to prevent "slip-mesh." It should be understood that the netting must not be allowed to relax from the time the knots are made until the knots are set.

While the process is effective in setting the knots, the characteristics of the twine material are not heat modified as they are for example when a heating process is used.

The impregnating resins which are used in accordance with the present invention are those which are alcohol-soluble and which when deposited from solution are sufficiently film-forming to have enough strength to form a skeleton structure within the twine, thereby to retain the twine in the configuration of a knot.

When an alcohol-insoluble synthetic resin is added to the rosin solution, any thermoplastic easily available resins which are alcohol-soluble are useful. Preferred impregnants are alcohol-soluble polyamides, acrylic resins, polyesters, vinyl copolymers, polyvinyl acetals, particularly polyvinyl butyral and cellulose acetate.

The amounts of the alcohol-soluble resin in solution should be from about 0.5% to about 3% by weight.

As an example of a suitable alcohol-soluble synthetic resin which may be added to the rosin impregnating solution, there may be mentioned an alcohol-soluble form of nylon. One suitable form of this material is referred to as "F.M. 6501" in the catalogue, "Dupont Nylon Molding Powder," copyright 1948, Serial No. A-7257. Other types of nylon which are useful are known under the specifications of 6B and type 8. The alcohol-soluble resin is put into solution from 0.5% to 3% by weight, preferably about 1%, in methyl or isopropyl alcohol which preferably contains water up to about 20%. The amount of nylon in the solution is computed on total liquid. The resin may be dissolved by heating the alcohol to about 150° F. and agitating thoroughly.

The resin stays in the solution and, unlike solutions having a high concentration of resin, an antigelling constituent for example furfural, need not be added but can be added if desired.

The temperature of the treating material in the bath is normal room temperature and the drying of the impregnated twine is also carried out at room temperature.

In certain cases, the change in weight of treated twine over untreated twine is approximately the same as the strength of the solution. For example, in the case of nylon twine, a 4% solution of rosin will produce a twine approximately 4% heavier than untreated twine. If a solution containing 5% rosin and 1% nylon is used the pick-up will be approximately 6%. Other fibres have different pick-ups; for example, polyethylene terephthalate resin requires an 8% solution to give a 4% heavier twine.

The process is applicable to treating netting made from synthetic yarn of any size. It may run for example from yarn of about 140 denier 3 ply yarn to about 210/100/3. In fact, the coarser the yarn the better since it picks up more of the impregnating solution.

The process may be applied to double or single knot netting although usually the double knot netting does not need treatment, so the preferred application is to netting made with single weaver's knots.

The process may be applied to netting made from polyamides, polyesters and partially acetylated cellulose derivatives. Nylon yarn or other yarns having similar characteristics, as for example "Dacron," "Orlon," etc., are particularly applicable. So the process can be said to be applicable generally to synthetic linear condensation polymers.

The process is particularly applicable to single knotted fish netting wherein it is surprising that it is effective to secure the knots owing to the very thin solution employed. It is the applicant's belief that the impregnation of the treating material sets up within the interstices of the filaments a skeleton structural formation which is elastic but keeps the form of the knots.

The invention is also applicable to treating twines for mending netting.

In making this twine, a tube or package is first wound under winding tension. Then the package is immersed in the solution for about 5 to about 15 minutes. Then, it is dried for 48 hours. The twine is slightly stuck together which has the advantage of keeping the package together.

Packages of one half pound and one pound can be made up.

The solution may also be used by fishermen to mend their nets, by applying it by hand or in a bath to the netting, particularly at the knots.

Another advantage of the applicant's method is that heating the netting is not required. Not having to heat eliminates shrinkage of the nylon and thus mesh-size difficulties. Also, larger twines for example those above 210/100/3 are hard to heat-set because the outside of the twine fuses before the inside gets hot, unless a very slow treatment is given.

In the process the netting is preferably advanced through the impregnating bath at normal knotting speed of say about 5 to 6 meshes per minute. This results in an immersion time for each knot ranging from about 15 to about 45 seconds. This is usually sufficient to give the solution long enough to penetrate the twine. Drying time is preferably from about 2 to about 5 minutes during which the netting must be kept under tension.

During the process and when the ends are tied into the machine, a drop of the impregnation solution can be applied to each knot to prevent it from coming loose.

In order to demonstrate specific procedures according to the invention, the following examples are given by way of explanation:

*Example I*

A nylon twine of 4,410 total denier after being woven into fish netting was the article treated.

The netting was immersed as described in the specification in a 4% rosin water base solution at normal room temperature.

The rosin solution was prepared by dissolving together 4 lbs. of U.S. grade M gum rosin in 92.8 lbs. water with the assistance of 2 lbs. of triethanolamine, 0.4 lb. sodium hydroxide, and 0.8 lb. ethyl alcohol. The gum rosin is the active ingredient and the others are merely assistants used to dissolve the gum rosin in water.

Each part of the netting was in the solution for about 20 seconds and was subsequently dried in air at room temperature. The netting evidenced that it was impregnated. It was characterized by absence of slip-mesh and loose knots. The netting was stable indefinitely. The twine was not stretched any more than it would have been had there been no impregnation.

*Example II*

The procedure of Example I was repeated but the solution made up of 5 lbs. U.S. grade M gum rosin, 1 lb. alcohol-soluble nylon resin, 15 lbs. water and 79 lbs. of 99% isopropyl alcohol.

To compare the effect of the rosin treatment with prior art procedures the following test procedure was evolved.

It is a fact that both the single knot and the double knot as commonly used in netting are composed of two threads. One thread is shaped into the form of a U and the other thread forms a cross-over with the U-shaped thread.

When force is applied to a mesh a slip-knot will be formed when the force is sufficient to straighten the thread which forms the U of the knot. Obviously if the U is straightened out then the other thread will be free to slip. The procedure for comparing the efficiency of different processes is to ascertain what force is required to straighten out the U of the knot and so produce a slip-knot.

The testing machine used in the tests is a Scott inclined plane (model I.P. 4), this is a constant rate of load machine which indicates the load in pounds. In making a test a knot is cut from the net and the two ends of the thread which forms the U of the knot are fastened in the two jaws of the machine. Load is then applied until the U-shaped portion has straightened out and the knot has inverted, or in other words until the knot has become a slip-knot. This load is then recorded.

For comparative tests various samples were made, each in the same mesh and twine size. The twine used was a nylon twine of 4,410 total denier. Ten tests were made on each sample and the results were as follows:

| Treatment on sample | Average force required to invert the knot, pounds |
| --- | --- |
| A. Untreated | 2.50 |
| B. 1% Alcohol soluble nylon resin on netting | 3.57 |
| C. Coating process of U.S. Patent 2,590,586 | 3.61 |
| D. 4% Gum Rosin in water | 12.25 |
| E. 5% Gum Rosin, 1% Alcohol soluble nylon in alcohol | 14.98 |

An examination of these results shows that the process of 1% alcohol soluble nylon obtains approximately the same result as the coating process (C) which uses 10% alcohol soluble nylon plus a stretching and heat setting process on the twine. In this case there is an economic advantage over the coating process.

Further study of the foregoing figures shows a radical change in the stability of the knot when gum rosin is used. The 4% gum rosin in water produces a knot which will stand three and a half times the load required to invert the knot treated by the coating process. Use of the gum rosin with alcohol soluble nylon in alcohol shows an even further improvement. It is believed these results demonstrate that the use of rosin gives great advantages over the coating process.

In addition to having this advantage of greater knot stability, the rosin has the added advantage over prior art that a water base can be used which is considerably cheaper than using alcohol. Or alternatively, if an alcohol base is used, a result is obtained which is four times as good as the result achieved with the coating process when measured by the knot-inversion method described above.

I claim:

1. A method of making fish netting which comprises forming netting on a netting machine from twine of a continuous filament high polymer synthetic resin by knotting and keeping such netting after knotting under a tension sufficient to maintain the knots tight, then continuing to keep the netting under tension after formation and advancing the netting while still under tension from the loom through an impregnating bath at room temperature containing a solution of a solvent in which the high polymer synthetic resin is insoluble and rosin in amount from about 1% to about 10% by weight thereby to impregnate the netting with the solution and removing the netting from the impregnating bath, while still under tension, and removing the solvent to leave a deposit of rosin impregnated in the twine of the netting whereby the form of the knots is retained, the formation, impregnation and solvent removal being carried out at a temperature which will not heat-modify the twine.

2. A method of making fish netting which comprises forming netting on a netting machine from twine of a continuous filament high polymer synthetic resin by knotting and keeping such netting after knotting under a tension sufficient to maintain the knots tight, then continuing to keep the netting under tension after formation and advancing the netting while still under tension from the loom through an impregnating bath at room temperature containing a rosin water base solution having a rosin content of from about 1% to about 10% by weight and from about 0.5% to about 3% of an alcohol-soluble synthetic resin thereby to impregnate the twine with the solution and removing the netting from the impregnating bath, while still under tension, and removing the solvent to leave a deposit of rosin impregnated in the twine of the netting whereby the form of the knots is retained, the formation, impregnation and solvent removal being carried out at a temperature which will not heat-modify the twine.

3. Fish netting, comprising essentially uncoated twine of a synthetic linear polymer knotted with tight single knots, the knots being substantially evenly spaced apart and intervened by precise lengths of twine and the knots being set to retain substantially the form and relationship to the twine that were given when knotted, the elastic memory of the twine material being intact and tending to cause loosening and slipping of the knots, the twine being impregnated with rosin by being passed at room temperature through a solution containing from about 1% to about 40% of rosin to subdue the tendency of the knots to slip, and said rosin being present in the netting in an amount in the neighborhood of about 1% to about 40% of the twine material by weight.

4. Fish netting, as defined in claim 3, wherein the rosin solution contains from about 1% to about 10% of rosin, and the netting contains rosin in an amount from about 1% to about 10% by weight of the twine material.

5. Fish netting, comprising essentially uncoated twine of a synthetic linear polymer knotted with tight single knots, the knots being substantially evenly spaced apart and intervened by precise lengths of twine and the knots being set to retain substantially the form and relationship to the twine that were given when knotted, the elastic memory of the twine material being intact and tending to cause loosening and slipping of the knots, the twine being impregnated with a rosin and an alcohol soluble synthetic resin by being passed at room temperature through an alcohol solution containing from about 1% to about 10% of rosin and from about .5% to about 3% by weight of said resin to subdue the tendency of the knots to slip, and said rosin being present in the netting in an amount in the neighborhood of about 1% to about 10% of the twine material by weight.

References Cited in the file of this patent
UNITED STATES PATENTS

| | | |
|---|---|---|
| 2,491,454 | Nute | Dec. 13, 1949 |
| 2,590,586 | Thompson et al. | Mar. 25, 1952 |
| 2,653,372 | Johnson et al. | Sept. 29, 1953 |
| 2,744,306 | Haller | May 8, 1956 |
| 2,775,860 | Morrison | Jan. 1, 1957 |
| 2,792,617 | Haller | May 21, 1957 |
| 2,823,575 | Needham et al. | Feb. 18, 1958 |
| 2,823,576 | Needham et al. | Feb. 18, 1958 |
| 2,870,669 | Hopacki | Jan. 27, 1959 |